United States Patent [19]

Edelman

[11] 4,293,469

[45] Oct. 6, 1981

[54] PRODUCTION OF AN IMPROVED NON-REINFORCED POLYOXYMETHYLENE MOLDING COMPOSITION WHICH FORMS REDUCED MOLD DEPOSITS UPON MOLDING

[75] Inventor: Robert Edelman, Staten Island, N.Y.

[73] Assignee: Celanese Corporation, New York, N.Y.

[21] Appl. No.: 846,661

[22] Filed: Oct. 28, 1977

Related U.S. Application Data

[63] Continuation-in-part of Ser. No. 752,212, Dec. 17, 1976, abandoned.

[51] Int. Cl.³ .................... C08K 5/16; C08L 59/02
[52] U.S. Cl. .................... 260/45.9 P; 260/45.9 D; 525/398
[58] Field of Search ............. 260/823, 45.9 P, 45.9 D; 525/398

[56] References Cited

U.S. PATENT DOCUMENTS

| | | | |
|---|---|---|---|
| 3,135,718 | 6/1964 | Wagner et al. | 260/45.9 P |
| 3,170,896 | 2/1965 | Wagner et al. | 260/67 |
| 3,755,242 | 8/1973 | Reich | 260/37 N |
| 3,839,267 | 10/1974 | Golder | 260/37 AL |
| 4,071,503 | 1/1978 | Thomas et al. | 260/75 N |

FOREIGN PATENT DOCUMENTS 993600 5/1965 United Kingdom.

*Primary Examiner*—Harold D. Anderson
*Assistant Examiner*—Amelia B. Yarbrough
*Attorney, Agent, or Firm*—Kenneth A. Genoni

[57] ABSTRACT

The mold deposit problem commonly associated with non-reinforced polyoxymethylene molding compositions which creates a non-uniform surface on a molded article effectively is minimized. The polyoxymethylene polymer initially is heated (as described) while in admixture with about 0.25 to about 3 percent by weight based upon the weight of the polyoxymethylene polymer of a certain polycarbodiimide. The polycarbodiimide contains at least three carbodiimide units per polycarbodiimide molecule and is derived from one or more aromatic diisocyanates which are unsubstituted or are substituted with up to one methyl substituent on each aromatic ring.

16 Claims, No Drawings

PRODUCTION OF AN IMPROVED NON-REINFORCED POLYOXYMETHYLENE MOLDING COMPOSITION WHICH FORMS REDUCED MOLD DEPOSITS UPON MOLDING

CROSS-REFERENCE TO RELATED APPLICATION

This is a continuation-in-part of U.S. Ser. No. 752,212, filed Dec. 17, 1976, now abandoned.

BACKGROUND OF THE INVENTION

The present invention relates to a process for minimizing the mold deposit problem frequently encountered when non-reinforced polyoxymethylene molding compositions are molded. Such deposits are detrimental to the formation of a quality molded article having smooth and uniform surface characteristics.

As is well known, polyoxymethylene, or polyacetal, is a thermoplastic resin which finds wide utility in the manufacture of shaped articles by injection molding or extrusion processes. Polyoxymethylene has many excellent mechanical properties which result in shaped articles characterized by their hardness, strength and toughness.

Polyoxymethylene resin, however, is subject to degradation particularly under the influence of heat, the amount of degradation being a factor of the method of preparation of the polyoxymethylene and the like. The degradation may occur for example, as the result of oxidative attack. The oxidative attack, which may lead to chain scission and depolymerization, is often retarded by the addition of antioxidants to the polyoxymethylene composition. Degradation is also believed to occur as the result of acidolytic cleavage of the polymer chain caused by acidic species present in the polymer. The acidic species may be acidic catalyst residues derived from catalysts used in the formation of the polymer or may be acetic acid generated from acetate end groups when a given chain, so stabilized, depolymerizes as a result of occasional oxidative or acidolytic chain scission. To assist in minimizing such degradation of polyoxymethylene especially during subsequent processing in the hot, or melt, state, "acid scavengers" are often admixed with the polymer composition.

Albeit most commercially available polyoxymethylene is "prestabilized" either by means of acetylation or hydrolysis treatments (see, for example, U.S. Pat. No. 3,839,267) or by the addition of additives such as the above-mentioned antioxidants and/or acid scavengers, it has been found that during the high-temperature molding of a non-reinforced polyoxymethylene molding composition, particularly, injection molding of the resin an objectionable film, or mold deposit, commonly forms on the surface of the mold. The mold deposit, which can lead to surface defects on the molded resin, is generally believed to be of two types. One type of mold deposit is believed to be caused by the use of certain antioxidants which plate out on the mold surface. This type of mold deposit can be eliminated by using a less volatile antioxidant. The second type of mold deposit is believed to be caused by formaldehyde (generated, for example, as a result of the chain scission of the polyoxymethylene under the conditions of the molding process) condensing on the mold surface. The chain scission, in turn, is believed to be caused by acidic residues present in the polyoxymethylene and which have not been "cleaned up" by the prior stabilization treatments.

Polyoxymethylene compositions thermally stabilized with certain carbodiimides are disclosed in British Pat. No. 993,600. The patent suggests, however, that the primary importance of the carbodiimides is their anti-aging effect and that the carbodiimides have no significance in the stabilization of polyoxymethylene under the usual test methods for thermostability at temperatures of 180° to 220° C. (disclosed to be heating in an open vessel under nitrogen for at least 20 minutes). It is stated that under such conditions the carbodiimides may even increase the decomposition of polyoxymethylenes after about 20 minutes heating time. The patent broadly suggests that mono- and polycarbodiimides, generally, function in the manner stated above, but the specific working examples are limited to the use of severely hindered carbodiimides such as 2,6,2',6'-tetraisopropyldiphenylcarbodiimide and the polycarbodiimide of 1,3,5-triisopropyl-benzene-2,4-diisocyanate.

Carbodiimides are also employed in the acylation of high molecular weight polyoxymethylenes as disclosed in U.S. Pat. No. 3,170,896. The carbodiimides serve to reduce acidolytic degradation during acylation of the polymers caused by traces of free acids present in the organic acid anhydrides employed in the process. Monocarbodiimides and poly-functional carbodiimides are generically disclosed as being useful in the process of the patent although specific examples are limited to mono- and biscarbodiimides. The reason for this is to maximize solubility in the acylating medium. Polycarbodiimides are not desirable because of their more limited solubility. It is also clear that the procedures used indicate a desire to remove any carbodiimides or carbodiimide reaction products after acylation takes place. Following the acylation reaction the acylated polymers are filtered from the reaction medium and freed of reaction medium residues including the carbodiimides by appropriate washing. There is no appreciation of the fact that future processing of the polyoxymethylene could generate acidic species such as formic acid in excess of that which can be normally handled by a standard stabilizer package which ultimately could result in degradation of the polyoxymethylene and mold deposit formation.

U.S. Pat. No. 3,135,718 discloses the polymerization of formaldehyde in the presence of organic acid anhydride acylating agents. Carbodiimides are disclosed for use in purifying the acylating agents of the process of the patent. The class of carbodiimides disclosed to be useful in the process is substantially identical to that of U.S. Pat. No. 3,170,896.

In the past certain polycarbodiimides have been employed as heat and hydrolysis stabilizers for polyesters as well as in a variety of other areas as illustrated in U.S. Pat. Nos. 3,193,522; 3,193,523; 3,296,190; 3,575,931; and 3,835,098; U.S. Ser. No. 715,946, filed Aug. 19, 1976; U.S. Ser. No. 753,384, filed Dec. 22, 1976; British Pat. Nos. 1,056,202; 1,231,975; and 1,330,036; Japanese Document No. 75-00044 (summarized in Chemical Abstract, 172327W, Vol 82, 1975); Belgian Pat. No. 626,176 (summarized in Chemical Abstract, 2054f, Vol. 61, 1964); and *Preparation of Carbodiimides from Isocyanates*, by W. Neumann and P. Fischer, 1 Angew. Chem. Internat. Edit. 625 (1962).

It is an object of the invention to provide a process for the preparation of an improved non-reinforced polyoxymethylene molding composition, i.e., a stabilized non-reinforced polyoxymethylene molding composition which forms substantially reduced mold deposits upon molding.

It is a further object of the invention to provide a non-reinforced polyoxymethylene molding composition having high stability when subjected to the influence of heat and particularly when subjected to the conditions typically encountered during molding operations.

It is still another object of the present invention to provide an improved non-reinforced polyoxymethylene composition for an injection molding process.

Another object of the present invention is providing a process for the preparation of a stabilized non-reinforced polyoxymethylene molding composition employing a specifically defined class of polycarbodiimides not employed heretofore in the art with respect to the stabilization of polyoxymethylenes.

These and other objects of the invention will become apparent from the following summary and description of preferred embodiments.

SUMMARY OF THE INVENTION

According to the present invention it has now been found that a particular class of polycarbodiimides, particularly, unhindered aromatic polycarbodiimides having up to one methyl substituent per aromatic ring and having at least three carbodiimide groups per molecule, increase the thermal stability of non-reinforced polyoxymethylenes so as to substantially eliminate mold deposits upon molding. The addition of the polycarbodiimides to polyoxymethylene has been found to reduce the amount of formaldehyde generated by the polyoxymethylene when subjected to the influence of heat, particularly when subjected to conditions which have previously been believed to result in objectionable formaldehyde-type mold deposits.

The improved molding composition, i.e., stabilized polyoxymethylene, is prepared by heating the non-reinforced polyoxymethylene and the polycarbodiimide for at least about two minutes at a temperature at which the polyoxymethylene is molten (generally above 160° C.). The amount of polycarbodiimide used is from about 0.25 to about 3 percent by weight based on the weight of the polyoxymethylene polymer.

In short, it has been found that the polycarbodiimides identified herein effectively prevent or reduce degradation of the polyoxymethylene polymer under conditions similar to those which are stated in British Pat. No. 993,600 to lead to decomposition of the carbodiimides disclosed therein or under which the carbodiimides show no effect as heat stabilizers for polyoxymethylene.

DESCRIPTION OF PREFERRED EMBODIMENT

As used herein the term "polyoxymethylene" is intended to include both homopolymers, including so-called capped homopolymers, i.e., acylated homopolymers, as well as copolymers as will be defined more specifically below.

The thermal stability provided by the addition of the specified polycarbodiimides to the polyoxymethylene polymer according to the present invention is stability against degradation when the polyoxymethylene is subjected to the influence of heat. The polycarbodiimides are believed to provide stability against any of the degradative effects of heat including, for example, aging of molded polyoxymethylene articles at temperatures of from 100° C. to 140° C., but are particularly useful in providing stability against degradation when the polyoxymethylene is subjected to the temperatures and conditions typically encountered during the molding of the polyoxymethylene into shaped articles, i.e., temperatures of from about 185° C. to about 240° C. for a period of several minutes.

A particularly preferred application of the improved polyoxymethylene molding composition is in the injection molding of polyoxymethylene because the manifestations of the instability, or degradation, of polyoxymethylene are more troublesome in this type of operation than in, for example, an extrusion operation. In the extrusion of polyoxymethylene, formaldehyde which may be generated during degradation of the polymer does not have an opportunity to condense on a mold surface and may escape through vents provided on the extruder.

Injection molding is intended to refer to any of the well-known processes wherein a polyoxymethylene molding composition is heated in a preheating zone to a plastic state or melt, and is thereafter forced through a nozzle into a closed mold. Heating of the polyoxymethylene is typically to a temperature of from about 180° C. to about 240° C. The temperature of the mold is generally substantially lower, e.g., about 100° C. lower, although the exact relationship between the melt temperature and the mold temperature is dependent on factors such as the desired surface characteristics of the shaped article as will be appreciated by the art-skilled person. Mold deposit can be noticed at any of the recommended molding temperatures when a poor quality polyoxymethylene copolymer is employed (usually after 25–50 shots) and tends to be greater with higher melt temperatures and lower mold temperatures. The tendency toward mold deposit varies according to the particular polyoxymethylene, prestabilization treatment, and the like. Thus for example, acylated homopolymer generally produces mold deposit problems less frequently than a melt hydrolyzed copolymer. The occurrence of the mold-deposit problems depends additionally on the size of the molded part, gating and venting. Small parts, small gates and inadequate venting give the most problems. The mold deposit tends to cause imperfections on the surface of the molded parts. Such parts must be ground up and remolded.

The addition of the polycarbodiimides to the polyoxymethylene according to the present invention is effective in providing thermal stabilization at the molding (melt) temperatures, but may not be effective above temperatures of about 250° C. because adducts of the polycarbodiimide and any acid species present in the polyoxymethylene may not be stable.

The injection molding may be carried out in conventional injection-molding apparatus having, for example, a preheating cylinder, plunger or reciprocating screw, torpedo, nozzle and mold including a sprue, runners, gates and mold cavities. Cylinder temperatures are usually between about 180° C. and about 240° C. and molding pressures are usually between about 5,000 and 20,000 psi. Actual molding temperatures and pressures will vary depending on the type of machine, i.e., plunger injection molding machine or screw injection molding machine, employed or on the desired shape and size of the molded article. Cycle times are usually between about 30 and about 110 seconds.

Polyoxymethylene polymer which may be stabilized with the polycarbodiimide in accordance with the present invention, as stated above, includes both homopolymers and copolymers. Such polymers, which may be produced according to methods well-known in the art have recurring —OCH$_2$— units and are typically prepared by the polymerization of anhydrous formaldehyde or by the polymerization of trioxane.

Particularly useful in this invention is polyoxymethylene copolymer having at least one chain containing recurring oxymethylene (—OCH$_2$—) units interspersed with —OR— groups in the main polymer chain, where R is a divalent radical containing at least two carbon atoms directly linked to each other and positioned in the chain between the two valences with any substituents on said R radical being inert, i.e. substituents which will not induce undesirable reactions. Preferred copolymers contain from 60 to 99.6 mole percent of recurring oxymethylene groups. In a preferred embodiment R may be, for example, an alkylene or substituted alkylene group containing at least two carbon atoms.

Among the copolymers which are utilized in accordance with the invention are those having a structure comprising recurring units of the formula:

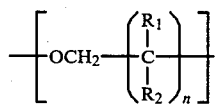

wherein n is zero or an integer of from 1 to 5, and wherein n is zero in from 60 to 99.6 percent of the recurring units. R$_1$ and R$_2$ are inert substituents, that is, substituents which will not cause undesirable reactions.

A preferred class of copolymers are those having a structure comprising recurring units wherein from 60 to 99.6 percent of the recurring units are oxymethylene units. These copolymers are prepared by copolymerizing trioxane with a cyclic ether having the structure:

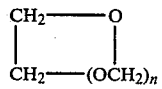

where n is 0, 1 or 2.

Examples of other preferred polymers include copolymers of trioxane and cyclic ethers containing at least two adjacent carbon atoms, such as the copolymers disclosed in U.S. Pat. No. 3,027,352.

Among the specific ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred polymers treated in accordance with the present invention are moldable thermoplastic materials having a weight average molecular weight of at least about 35,000, a melting point of at least about 150° C., and an inherent viscosity of at least about 0.8 (measured at 60° C. in a 0.1 weight percent solution in p-chlorophenol containing 2 weight percent of alpha-pinene).

As understood by those skilled in the art, the polyoxymethylene preferably should be pre-stabilized prior to being heated in admixture with the specific polycarbodiimide. Such pre-stabilization may take the form of degradation of the molecular ends of the polymer chain to a point where a relatively stable carbon-to-carbon linkage exists at each end. For example, such degradation may be effected by melt hydrolysis such as that disclosed in U.S. Pat. No. 3,318,848 or by solution hydrolysis such as that disclosed in U.S. Pat. No. 3,219,623. Mixtures of melt hydrolyzed and solution hydrolyzed polyoxymethylene polymer may be employed. The polyoxymethylene may also be pre-stabilized by admixing therewith conventional stabilizers, such as an antioxidant (e.g. in a concentration of about 0.1 to 2.0 percent by weight) and/or an acid scavenger (e.g. in a concentration of about 0.05 to 1.0 percent by weight). Generally, these stabilizers will be present in a total amount of less than about 3 percent by weight based on the weight of the polyoxymethylene polymer.

The polycarbodiimides which may be used in the present invention are selected from a particularly defined group. Not all polycarbodiimides will provide thermal stabilization of polyoxymethylenes against the conditions commonly encountered during the molding thereof. It has been found that only those polycarbodiimides which both (a) are derived from one or more aromatic diisocyanates which are either unsubstituted or contain up to one methyl substituent on each aromatic ring, and (b) contain at least three carbodiimide units per polycarbodiimide molecule will achieve the desired result. Aromatic diisocyanates which are more heavily substituted will result in polycarbodiimides which form adducts with any acidic species present in the polyoxymethylene. Such adducts are relatively unstable at temperatures above about 200° C. It is believed that the instability is dependent on the number and size of groups that are substituted on the aromatic diisocyanate moieties of the polycarbodiimide. The more heavily substituted isocyanates most likely yield polycarbodiimide-adducts in the polyoxymethylene system that are unstable at temperatures much above 200° C. Lesser substituted isocyanates likely result in polycarbodiimide-adducts that are progressively more stable at temperatures above 200° C.; the polycarbodiimides according to the invention being stable up to a temperature of about 250° C. Carbodiimides having less than three carbodiimide units per polycarbodiimide molecule are not suitable because they are too volatile for practical use at the temperatures typically encountered in a molding, e.g., injection molding, operation and may tend to exude during molding. Additionally, such carbodiimides do not mix well with the polyoxymethylene.

The polycarbodiimide should be such that it is miscible with the polyoxymethylene in the molten state. The polycarbodiimides useful in the present invention may have number average molecular weights of generally from about 450 to about 10,000, typically from about 800 to about 8,000, and preferably from about 1,000 to about 6,500. Polycarbodiimides having molecular weights greater than about 10,000 may not dissolve in the polyoxymethylene melt and thus may not be useful in the present invention.

Polycarbodiimides which are useful in the present invention typically include poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), and mixtures thereof. Preferred polycarbodiimides include poly(tolyl carbodiimide), poly(4,4'-diphenylmethane carbodiimide), and mixtures thereof. The poly(4,4'-diphenylmethane carbodiimide) is particularly preferred because it has been found to be very reactive and to blend well with the polyoxymethylene. Additionally, it imparts only a light yellow color to the blend. The poly(tolyl carbodiimide) is slightly less reactive and imparts a more intense color to the blends.

The polycarbodiimide may be prepared in any manner known to those skilled in the art, for example, by heating the aromatic diisocyanate compounds defined above in the presence or absence of a solvent. The formation of the polycarbodiimide is accompanied by the evolution of carbon dioxide gas.

Although the polycarbodiimides useful in the present invention may be prepared without the use of a catalyst, much higher temperatures (ca. 300° C.) are needed in the absence of a catalyst. For certain polycarbodiimides, the use of such high temperatures may result in the formation of large quantities of side products and colored products. Thus, the polycarbodiimides may be typically prepared by heating the isocyanates in the presence of a catalyst such as the phosphorus containing catalysts described in U.S. Pat. Nos. 2,853,473, 2,663,737, and 3,755,242, and also in Monagle, J. Org. Chem. 27, 3851 (1962). Phospholine oxides such as those described in Campbell et al, J. Amer. Chem. Soc. 84, 3673 (1962) are preferred catalysts. A particularly preferred catalyst is 1-ethyl-1-3-methyl-3-phospholine-1-oxide.

The polycarbodiimide formation reaction is preferably carried out under an atmosphere of argon or other dry inert gas so as to minimize the amount of water which may be in contact with the reactants since isocyanates tend to react rapidly with water at elevated temperatures.

Aromatic diisocyanates which may be used in preparing the desired polycarbodiimides include, for example, toluene diisocyanate, 4,4'-diphenylmethane diisocyanate, 3,3'-dimethyl-4,4'-biphenylene diisocyanate, p-phenylene diisocyanate, m-phenylene diisocyanate, 3,3'-dimethyl-4,4'-diphenylmethane diisocyanate and mixtures thereof.

Preferred aromatic diisocyanates are toluene diisocyanate, 4,4'-diphenylmethane diisocyanate, and mixtures thereof.

The aromatic diisocyanates are preferably employed in an essentially pure state but may contain minor amounts (i.e., less than about 2 percent by weight) of other compounds such as ureas, amines, and traces of water and/or acid. The term "toluene diisocyanate" is meant to include 2,4-toluene diisocyanate, 2,6-toluene diisocyanate, or any combination of these isomers. Mixtures of the 2,4- and 2,6-isomers typically contain either 80 parts by weight 2,4-toluene diisocyanate and 20 parts by weight 2,6-toluene diisocyanate, or 65 parts by weight 2,4-toluene diisocyanate and 35 parts by weight 2,6-toluene diisocyanate.

Small amounts (i.e., 50 percent by weight or less) or aromatic monoisocyanates may also be used in conjunction with the aromatic diisocyanates in the preparation of the polycarbodiimides which are employed in the process of the present invention. These monoisocyanates act as chain stoppers and help control the molecular weight and viscosity of the resulting polycarbodiimides. The amount of aromatic monoisocyanate used depends upon the particular diisocyanate employed, but generally from about 20 to about 50, typically from about 25 to about 45, and preferably from about 30 to about 40 percent by weight of the monoisocyanate and correspondingly generally from about 50 to about 80, typically from about 55 to about 75, and preferably from about 60 to about 70 percent by weight of diisocyanate based upon the total weight of the isocyanate compounds may be employed.

Aromatic monoisocyanates which may be used in this way include, for example, p-chlorophenyl isocyanate, m-chlorophenyl isocyanate, phenyl isocyanate, p-methoxyphenyl isocyanate, m-methoxyphenyl isocyanate, p-tolyl isocyanate, m-tolyl isocyanate, o-tolyl isocyanate, p-nitrophenyl isocyanate, m-nitrophenyl isocyanate, and mixtures thereof.

Phenyl isocyanate, p-chlorophenyl isocyanate, m-chlorophenyl isocyanate, and mixtures thereof are preferred monoisocyanates for use in the present invention.

Monoisocyanates alone may not be used to prepare the polycarbodiimides since polymeric carbodiimides would not result from the heating of monoisocyanates alone.

The polycarbodiimide is mixed or blended with the polyoxymethylene composition (i.e. pre-stabilized polyoxymethylene) in an amount of from about 0.25 to about 3 percent by weight based on the weight of the polyoxymethylene and more preferably in an amount of from about 0.5 to about 2 percent by weight. Amounts of polycarbodiimide of less than about 0.25 percent by weight may require extensive mixing with the polyoxymethylene to achieve a desired stabilization whereas amounts of greater than about 3 percent by weight tend to alter adversely the physical properties, i.e., tensile strength, Izod impact values and the like, of the polyoxymethylene. Any of the polycarbodiimides included within the description presented above may be used alone or in mixture with other of the polycarbodiimides to achieve the desired thermal stabilization.

The polyoxymethylene and polycarbodiimide are heated to a temperature at which the polyoxymethylene is molten or in the melt state. Generally, a temperature above about 160° C. is required, preferably above about 180° C., and more preferably between about 180° C. and about 240° C. Temperatures much higher than about 240° C. may lead to degradation of the materials and/or possible adverse side reactions. Thus, the temperature range is one which will maintain the polyoxymethylene in melt form but not cause degradation or adverse side reactions.

The polyoxymethylene and polycarbodiimide are maintained at these temperatures for at least about 2 minutes and usually from about 2 to 20 minutes. Caution should be employed when longer times are used particularly above 20 minutes as the polymer materials may tend to degrade.

The exact time employed will depend primarily on the particular apparatus in which the polymers are heated. More efficient mixing and heating devices such as a Werner-Pfleiderer ZSK twin screw extruder will of course require less time than, for example, devices such as a Brabender plastograph.

In general, the polyoxymethylene and polycarbodiimide may be mixed or blended and heated in any convenient manner or apparatus as long as the polyoxymethylene is molten and in intimate contact with the polycarbodiimide for at least about 2 minutes while in such a state. If desired the polymers can first be dry blended and thereafter heated or they can be initially admixed in the heating apparatus.

It is believed that the polycarbodiimide reacts with the acid residues in the polyoxymethylene during the heating step, thus stabilizing the polyoxymethylene when it is subsequently molded, i.e., formaldehyde mold deposit is decreased. Accordingly the most efficient means of heating and mixing the polymers are desirable to assure complete polycarbodiimide-acid residue reaction and hence substantial elimination of the formaldehyde mold deposit during subsequent molding.

For this reason direct addition of the polycarbodiimide to the polyoxymethylene in the molding apparatus is not recommended unless sufficient preheat time is provided for the materials to be mixed and the polycarbodiimide-acid residue reaction to occur before the molding composition enters the mold cavity.

If desired, the polyoxymethylene and polycarbodiimide may be mixed and heated as set forth above, pelleted and stored for later use in the molding process.

Polyoxymethylene molding compositions of the present invention, in addition to including the polyoxymethylene and the polycarbodiimide, optionally may also include a minor quantity of additives conventionally employed in non-reinforced polyoxymethylene molding compositions both polymeric and non-polymeric, such as lubricity agents, dyes and conventional antioxidants and acid scavengers, etc. as discussed above.

The polycarbodiimides utilized in the present process are believed to be somewhat unique in that they mix well with the polyoxymethylene without undue exudation and the mold deposit problem is effectively eliminated. Excessive color formation is often encountered if large amounts of conventional basic acid scavengers are employed. Also, as discussed below there is no significant reduction in molded article properties as is commonly encountered if particulate nonpolymeric additives are utilized.

Molded articles prepared from the polycarbodiimide-stabilized polyoxymethylene molding composition according to the present invention show only a slight decrease, typically less than 10 percent, in physical properties (tensile, modulus, impact strengths, and the like) as compared to articles prepared from polyoxymethylene compositions not including the polycarbodiimide.

As indicated hereinabove, the polyoxymethylene molding compositions of the present invention show increased thermal stability when heated to temperatures of from about 180° C. to about 240° C. The thermal stability can be measured by heating the polyoxymethylene composition in all glass apparatus at a temperature of either 218° C. or 228° C.±2° C. for 30 minutes. At the end of this time a vacuum is applied to the system and the liberated formaldehyde is drawn through two sodium sulfite traps. The quantity of formaldehyde in the traps is then determined by titration with a standard acid. The amount of formaldehyde given off is a reasonable measure of the thermal stability and of the tendency of the composition to form mold deposits.

The invention thus provides a means for thermally stabilizing polyoxymethylene in a short time and employing small concentrations of a particular class of polycarbodiimide.

The invention is additionally illustrated in connection with the following examples which are to be considered as illustrative of the present invention. It should be understood, however, that the invention is not limited to the specific details of the examples.

EXAMPLES

The thermal stability of the non-reinforced polyoxymethylene composition according to this invention is shown in Tables I, II and III.

In the Tables, Polymers I–IV are polyoxymethylene copolymers each prepared in the same manner from trioxane and ethylene oxide (2 percent by weight) with each having a weight average molecular weight of approximately 68,000. Polymers I, II and IV had each been melt hydrolyzed according to the process of U.S. Pat. No. 3,318,848. These polymers are considered to be high mold deposit materials. Polymer III is believed to be a mixture of 75% melt hydrolyzed (according to the process of U.S. Pat. No. 3,318,848) and 25 percent solution hydrolyzed (by a process such as that described in U.S. Pat. No. 3,219,623) material. Polymer III is considered to be a marginal mold deposit material. Each of the polymers also has been "stabilized" or "pre-stabilized" prior to compounding with the polycarbodiimide with a standard additive package including 0.5 percent 2,2'-methylene-bis-(4-methyl-6-tertiary butyl phenol) antioxidant, 0.1 percent cyanoquanidine acid scavenger, and about 0.2 percent diamide synthetic wax lubricant available from Glyco Chemicals, Inc. under the designation Acrawax C lubricant.

Additive A of the tables is an unhindered polycarbodiimide according to the present invention, poly(4,4'-diphenylmethane carbodiimide), having a number average molecular weight of about 5,000 and sold by the Upjohn Company.

Additives B and C of the Tables are employed for comparative purposes and are severely hindered carbodiimides. Additive B is a monocarbodiimide, believed to be 2,6,2',6',-tetraisopropyl diphenylcarbodiimide, sold under the mark Stabaxol M, by Bayer A. G., Leverkusen, Germany. Additive C is a polycarbodiimide, believed to be poly(2,6,2',6'-tetraisopropyl diphenylcarbodiimide), sold under the mark Stabaxol PCD by Bayer A. G.

The molding compositions containing an additive were prepared by blending with 50 grams of the polyoxymethylene polymer the additives in a Brabender Plasticorder plastograph at 30 or 35 RPM for 10 or 12 minutes at 200° C., after the complete melting of the polyoxymethylene polymer. The compositions of Table I were milled in the plastograph at 35 RPM for 10 minutes at 200° C. unless otherwise indicated. The compositions of Table II were milled in the plastograph at 30 RPM for 10 minutes at 200° C. The compositions of Table III were milled in the plastograph at 30 RPM for 12 minutes at 200° C.

The percent generated formaldehyde (which was based on the weight of the polyoxymethylene polymer sample being analyzed) was determined by the method heretofore described.

TABLE I

| Example No. | Composition[4] | Percent Generated Formaldehyde (218° C.) |
|---|---|---|
| 1 | Polymer I[1] (Control) | 0.16 |
| 2 | Polymer I + 0.5 percent Additive A[3] | 0.09 |
| 3 | Polymer I + 1 percent Additive A[3] | 0.05 |
| 4 | Polymer II[1] (Control) | 0.14 |
| 5 | Polymer II + 1 percent Additive A[3] | 0.04 |
| 6 | Polymer I[2] | 0.19 |
| 7 | Polymer II[2] | 0.23 |

TABLE I-continued

| Example No. | Composition[4] | Percent Generated Formaldehyde (218° C.) |
|---|---|---|
| 8 | Polymer III[2] | 0.13 |

[1]This sample was milled in the plastograph in the absence of any additive.
[2]These samples were not subjected to any milling in the plastograph.
[3]All runs containing this additive were only slightly colored and were considered to be either off white or yellow in color.
[4]None of the runs containing an additive showed any torque increase on milling in the plastograph.

TABLE II

| Example No. | Composition | Percent Generated Formaldehyde (218° C.) |
|---|---|---|
| 9 | Polymer I[1] (Control) | 0.11 |
| 10 | Polymer I + 1 percent Additive A | 0.06 |
| 11 | Polymer I + 2 percent Additive B | 0.15 |

TABLE III

| Example No. | Composition | Percent Generated Formaldehyde (228° C.) |
|---|---|---|
| 12 | Polymer IV[1] (Control) | 0.27 |
| 13 | Polymer IV + 1 percent Additive A | 0.09 |
| 14 | Polymer IV + 1 percent Additive C | 0.21 |
| 15 | Polymer IV + 1 percent Additive B | 0.28 |
| 16 | Polymer IV + 0.5 percent Additive A | 0.11 |

It is readily seen that the "unhindered" polycarbodiimides defined for use in the process of the present invention provide the only effective stabilization against degradation of the polyoxymethylene under the test conditions.

In commonly assigned U.S. Ser. No. 846,663, filed Oct. 28, 1977 concurrently herewith of Jay R. Shaner and Robert Edelman, entitled "Improved Reinforced Polyoxymethylene Molding Composition Capable of Forming Composite Articles Exhibiting Improved Physical Properties", is claimed a fiber reinforced polyoxymethylene molding compositions which incorporates a small amount of a polycarbodiimide which primarily serves a non-analogous role (i.e. adhesion promotion between the chemical functionality of the oxymethylene polymer and the fibrous reinforcement) than that of the polycarbodiimide in the present process.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A process for improving the thermal stability at molding temperatures of from about 150° to about 240° C. of a polyoxymethylene molding composition which is free of fibrous reinforcement comprising heating a mixture of:
   (1) a polyoxymethylene polymer which exhibits a propensity to form mold deposits upon molding, and
   (2) about 0.25 to about 3 percent by weight based on the weight of the polyoxymethylene polymer of a polycarbodiimide which is (a) derived from an aromatic diisocyanate which is unsubstituted or substituted with up to one methyl group per aromatic ring and (b) contains at least three carbodiimide units per polycarbodiimide molecule, for at least about two minutes at a temperature at which the polyoxymethylene polymer is molten to yield a molding composition which forms a reduced quantity of mold deposits upon molding.

2. The process of claim 1 wherein the mixture is heated at a temperature above about 160° C.

3. The process of claim 1 wherein the mixture is heated at a temperature between about 180° C. and about 240° C. for a time period of from about 2 to about 20 minutes.

4. The process of claim 1 wherein the polycarbodiimide is selected from the group consisting of poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), and mixtures thereof.

5. A process for improving the thermal stability at molding temperatures of about 180° to about 240° C. of a polyoxymethylene molding composition which is free of fibrous reinforcement comprising heating a mixture of:
   (1) a polyoxymethylene polymer which exhibits a propensity to form mold deposits upon molding, and
   (2) about 0.5 to about 2 percent by weight based on the weight of the polyoxymethylene polymer of a polycarbodiimide which is (a) derived from an aromatic diisocyanate which is unsubstituted or substituted with up to one methyl group per aromatic ring and (b) contains at least three carbodiimide units per polycarbodiimide molecule, at a temperature between about 180° C. and about 240° C. for a time period from about 2 to about 20 minutes to yield a molding composition which forms a reduced quantity of mold deposits upon molding.

6. The process of claim 5 wherein the polyoxymethylene polymer has an inherent viscosity of at least 0.8 (measured at 60° C. in a 0.1 weight percent solution in p-chlorophenol containing 2 weight percent of alpha-pinene), a weight average molecular weight of at least 35,000 and a melting point of at least 150° C.

7. The process of claim 6 wherein the polyoxymethylene polymer is a copolymer comprising about 60 to about 99.6 mole percent recurring —OCH$_2$— groups.

8. The process of claim 7 wherein the polyoxymethylene polymer has been pre-stabilized by melt hydrolysis prior to mixture with component (2).

9. The process of claim 7 wherein the polyoxymethylene polymer is a mixture of melt hydrolyzed and solution hydrolyzed polymer prior to mixture with component (2).

10. The process of claim 1 wherein said antioxidant is 2,2'-methylene-bis-(4-methyl-6-tertiary butyl phenol) and said acid scavenger is cyanoguanidine.

11. The process of claim 8 wherein said polycarbodiimide is selected from the group consisting of poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), and mixtures thereof.

12. The process of claim 11 wherein said polycarbodiimide is poly(4,4'-diphenylmethane carbodiimide).

13. The process of claim 11 which includes the additional step of injection molding the resulting improved polyoxymethylene molding composition.

14. A polyoxymethylene molding composition having improved thermal stability at molding temperatures of from about 180° to about 240° C. which is free of fibrous reinforcement produced by the process of claim 1.

15. In a process for preparing a polyoxymethylene molding composition which is free of fibrous reinforcement and which exhibits a propensity to form mold deposits on molding comprising a polyoxymethylene polymer which has been pre-stabilized in accordance with the procedures selected from at least one member of the group consisting of (A) melt hydrolysis (B) solution hydrolysis and (C) admixing with said polyoxymethylene polymer at least one member selected from the group consisting of (i) at least one antioxidant and (ii) at least one acid scavenger, the improvement which comprises improving the thermal stability of said pre-stabilized molding composition at molding temperatures of from about 150° to about 240° C. by a method which comprises heating a mixture of:

(1) said pre-stabilized polyoxymethylene molding composition and (2) about 0.25 to about 3% by weight based on the weight of the polyoxymethylene polymer of a polycarbodiimide which is (a) derived from an aromatic diisocyanate which is unsubstituted or substituted with up to one methyl group per aromatic ring and (b) contains at least three carbodiimide units per polycarbodiimide molecule, for at least about two minutes at a temperature at which said polyoxymethylene polymer is molten to yield a molding composition which forms a reduced quantity of mold deposits upon molding.

16. The process of claim 15 wherein the polycarbodiimide is selected from the group consisting of poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), and mixtures thereof.

* * * * *